July 31, 1923.
W. F. DORAN
HEADLIGHT
Filed July 29, 1921
1,463,524
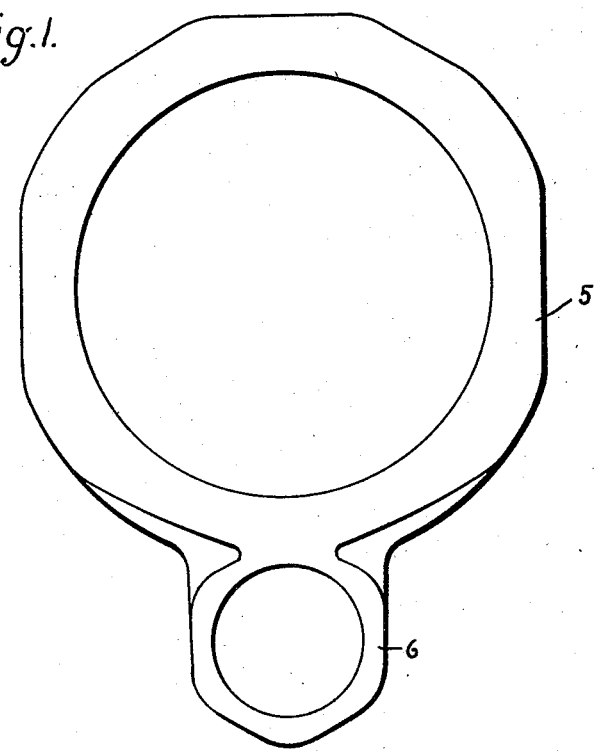
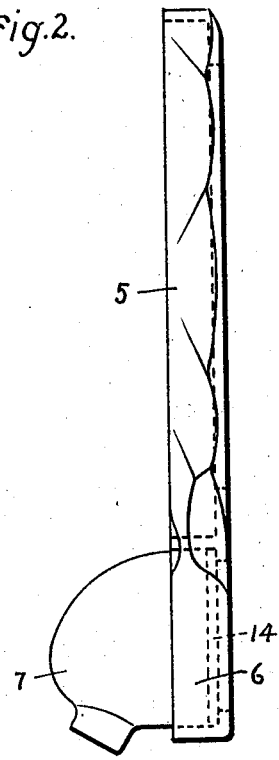
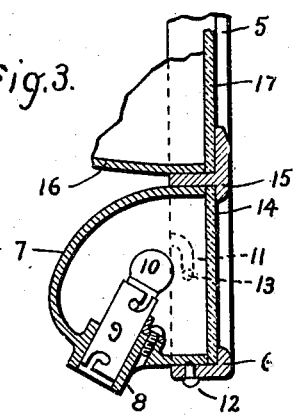
Inventor
William F. Doran.
by Alfred E. Bober
Atty.

Patented July 31, 1923.

1,463,524

UNITED STATES PATENT OFFICE.

WILLIAM F. DORAN, OF PHILADELPHIA, PENNSYLVANIA.

HEADLIGHT.

Application filed July 29, 1921. Serial No. 488,335.

*To all whom it may concern:*

Be it known that I, WILLIAM F. DORAN, a citizen of the United States, residing at Philadelphia, in the county of Philadelphia, State of Pennsylvania, have invented certain new and useful Improvements in Headlights, of which the following is a specification.

The present invention relates to headlights such as are used on automobiles. Usually the headlights furnished on an automobile comprise a single casing containing a reflector and a lens held over the front of the casing by a rim or frame. It is often desirable from the standpoint of both utility and appearance to provide in addition to the regular headlights small lights located directly adjacent them which may serve as parking lights or as running lights for use on city streets, which are well lighted at night by street lights.

The primary object of my invention is to provide an improved structure and arrangement whereby an ordinary headlight may be converted into a headlight of the type having a main larger headlight and a smaller parking light directly adjacent it; or in other words to provide an improved arrangement whereby a small parking light may be attached to an ordinary headlight so as to convert it into a headlight structure of the type comprising a main headlight and an adjacent smaller parking light.

A further object of my invention is to provide an arrangement which enables the ordinary headlight to be converted at a low cost into one embodying a parking light and without employing the services of a skilled workman.

For a consideration of what I believe to be novel and my invention, attention is directed to the following description and the claims appended thereto.

In the drawing, Fig. 1 is a face view of a rim or frame used in carrying out my invention; Fig. 2 is a side elevation of a structure embodying my invention, and Fig. 3 is a detail sectional view.

According to the illustrated form of my invention I provide a frame comprising a rim 5 which fits the main headlight casing and replaces the rim originally provided and a rim 6 for the parking light. The rims 5 and 6 are formed as an integral structure and may be made as a casting from any suitable metal such as aluminum, or they may be made by stamping. They are shaped and proportioned to give a pleasing appearance. I then provide a small casing 7 adapted to contain a reflector or present a reflecting surface and provided with a sleeve 8 which holds a lamp socket 9. In lamp sockets 9 is shown a lamp 10. Casing 7 fits rim 6 and may be attached thereto in any suitable manner. Preferably I attach casing 7 to rim 6 by means of bayonet joints as indicated at 11, two or more being utilized, and the casing may be fixed against accidental displacement by a set screw 12, which threads through rim 6 into engagement with casing 7. The bayonet joints are preferably arranged with the grooves in the rim and the pins, indicated at 13, on the casing. The lens for the parking light is indicated at 14. It is held between the end of casing 7 and flange 15 of the rim 6.

In Fig. 3 of the drawing, 16 indicates the casing of the main headlight and 17 its lens.

In use when it is desired to convert an ordinary headlight into one embodying a parking light the usual rim is removed and replaced by a frame as shown in the drawing, the rim 5 taking the place of the rim which has been removed and serving to hold the lens 17 in position. This then provides the rim 6 directly adjacent the headlight casing 16, which rim carries casing 7. To change his headlight, one has only to procure a frame comprising rims 5 and 6, and the small casing 7. These two members are sold as a unit and as is obvious they can be manufactured at a low cost and easily installed. Also they can be made in various sizes and shapes to adapt them to different sizes of headlights and different styles of automobiles. It is to be noted that to install the structure requires the boring of no holes or the defacing or destruction of any part of the original headlight. While I have particularly described my invention for use in replacing the ordinary rim of a headlight, it will be understood that it is not necessarily limited to use in this way but may be used as original equipment on a headlight casing.

When installed the structure forms an integral unit which is firmly supported and not likely to be loosed by vibration or to rattle.

In accordance with the provisions of the patent statutes, I have described the principle of operation of my invention, together with the apparatus which I now consider to represent the best embodiment thereof; but I desire to have it understood that the apparatus shown is only illustrative and that the invention can be carried out by other means.

What I claim as new and desire to secure by Letters Patent of the United States, is:—

1. As an article of manufacture, a rim adapted to replace the ordinary rim of a headlight, a smaller rim formed integral therewith, and means associated with and carried entirely by said smaller rim for forming therewith a complete unitary supplemental headlight lamp.

2. In combination, a main headlight casing, a rim thereon, a smaller rim carried by and formed integral with said first named rim, and a supplemental lamp casing attached to and carried by said smaller rim to form therewith a complete unitary headlight lamp.

3. As an article of manufacture, a rim adapted to replace the ordinary rim of a headlight, a small supplemental rim carried by and arranged outside said first named rim, and means carried entirely by said smaller rim and forming therewith a complete unitary supplemental headlight whereby by replacing the ordinary headlight rim there may be added to a main headlight a small supplemental headlight lamp.

In witness whereof, I have hereunto set my hand this 22 day of July, 1921.

WILLIAM F. DORAN.